(12) United States Patent
Feldmeier et al.

(10) Patent No.: US 8,128,439 B2
(45) Date of Patent: Mar. 6, 2012

(54) CONNECTING DEVICE FOR CONNECTING AN ELECTRICAL CONDUCTOR TO A SOLAR MODULE AND METHOD FOR THE PRODUCTION THEREOF, TOGETHER WITH A SOLAR MODULE WITH SUCH A CONNECTING DEVICE

(75) Inventors: Guenter Feldmeier, Lorsch (DE); Norbert Geister, Insheim (DE); Manfred Schaarschmidt, Lauteral (DE); Heinz Peter Scherer, Benshelm (DE); Andreas Woeber, Hirschberg (DE)

(73) Assignee: Tyco Electronics Amp GmbH, Bensheim (DE)

( * ) Notice: Subject to any disclaimer, the term of this patent is extended or adjusted under 35 U.S.C. 154(b) by 0 days.

(21) Appl. No.: 13/089,842

(22) Filed: Apr. 19, 2011

(65) Prior Publication Data
US 2011/0195585 A1    Aug. 11, 2011

Related U.S. Application Data

(63) Continuation of application No. PCT/EP2009/063362, filed on Oct. 13, 2009.

(30) Foreign Application Priority Data

Oct. 20, 2008 (DE) .......................... 10 2008 052 348

(51) Int. Cl.
*H01R 9/22* (2006.01)
(52) U.S. Cl. ....................................................... 439/709
(58) Field of Classification Search .................. 439/709, 439/856, 861, 862
See application file for complete search history.

(56) References Cited

U.S. PATENT DOCUMENTS

| | | | |
|---|---|---|---|
| 4,460,232 | A | 7/1984 | Sotolongo |
| 6,344,612 | B1 | 2/2002 | Kuwahara et al. |
| 2005/0054244 | A1 | 3/2005 | Werner et al. |
| 2006/0283628 | A1 | 12/2006 | Feldmeier et al. |
| 2007/0137689 | A1* | 6/2007 | Feldmeier et al. ............. 136/244 |

FOREIGN PATENT DOCUMENTS

| | | |
|---|---|---|
| DE | 20311183 U1 | 8/2004 |
| DE | 102007006433 A1 | 8/2008 |
| DE | 202007005126 U1 | 9/2008 |
| EP | 0999601 A1 | 10/2000 |
| JP | 2004134717 | 4/2004 |

OTHER PUBLICATIONS

German Office Action issued in co-pending German Application No. 10 2008 052 348.8, dated Oct. 20, 2008, 4 pages.
PCT Search Report issued in co-pending International Application No. PCT/EP2009/063362, dated Nov. 26, 2009, 5 pages.
PCT Written Opinion issued in co-pending International Application No. PCT/EP2009/063362, dated Nov. 26, 2009, 7 pages.

* cited by examiner

*Primary Examiner* — Javaid Nasri
(74) *Attorney, Agent, or Firm* — Barley Snyder (57) ABSTRACT

A connecting device that connects to at least one external electrical conductor of a photovoltaic solar module. The connecting device includes a plurality of busbars, a support element, a housing, a diode and a contact. The plurality of busbars are arranged next to one another, while the support element is attached to the plurality of busbars and includes a bottom face to be positioned on the solar module. The housing is positioned over the support element and the plurality of busbars and includes an edge surrounding the support element and the plurality of busbars when the overhousing is positioned on the solar module. The diode fits onto the plurality of busbars and includes diode leads that fit onto one of the plurality of busbars, such that the plurality of busbars are connected together through the diode.

25 Claims, 9 Drawing Sheets

CONNECTING DEVICE FOR CONNECTING AN ELECTRICAL CONDUCTOR TO A SOLAR MODULE AND METHOD FOR THE PRODUCTION THEREOF, TOGETHER WITH A SOLAR MODULE WITH SUCH A CONNECTING DEVICE

CROSS-REFERENCE TO RELATED APPLICATIONS

This application is a continuation of PCT International Application No. PCT/EP2009/063362 filed Oct. 13, 2009, which claims priority under 35 U.S.C. §119 to German Patent Application No.: DE 102008052348.8, filed Oct. 20, 2008.

FIELD OF THE INVENTION

The present invention relates to a connecting device and in particular to a connecting device for connecting at least one external electrical conductor to an electrical connection system of a photovoltaic solar module.

BACKGROUND

A photovoltaic solar module typically includes a panel-type multilayer arrangement with solar cells arranged therebetween, which generate electricity through a photovoltaic effect. For example, a multilayer arrangement of such a solar module includes a flat layer on the side exposed to light for instance in the form of a glass cover with low absorptivity and a flat second layer, which is arranged on the back of the solar module and takes the form for example of a rear glass cover. The solar cells are arranged in a corresponding space between these layers and are interconnected within the multilayer arrangement with an electrical connection system. Embodiments of solar modules are known, in which the electrical connection system of the solar cells on the rear of the solar module remote from the light-exposed side is connected on the outside by means of electrical conductors, for example in the form of connecting foils, for example to a consumer. These connecting foils are connected in a connecting device, for example in the form of a terminal box or a junction box, to one or more electrical conductors of a connecting lead, or "solar connecting lead". Accordingly, such a connecting device includes a current-carrying arrangement disposed in a connector housing, to which are connected, on the one hand, one or more connecting foils of the solar module and, on the other hand, one or more electrical conductors of one or more connecting cables. In addition, one or more diodes are generally contained in such a connecting device, which are provided in order to prevent circulating currents between sunlight-exposed solar cells and shaded solar cells, which supply different solar currents and solar voltages. By means of such "bypass diodes", it is possible to continue operating the module even when it is partially shaded and with corresponding reduced power.

A connection device for connecting external connecting cables to a solar panel is known, for example, as disclosed JP 2004 134 717 A. The connection device described therein includes a printed circuit board, on which a plurality of conductor tracks are arranged, in order to connect an electrical connection system of a solar panel to a respective connecting cable. Furthermore, a plurality of diodes are mounted on the printed circuit board, which in each case connect two of the conductor tracks together. The connecting cables to be connected to the printed circuit board are in each case positioned on one of the conductor tracks applied to the printed circuit board and connected thereto, before a housing is mounted on the arrangement and connected to the solar panel. The housing has a housing edge surrounding it, which is placed onto the solar module. A cavity formed between printed circuit board and housing is then filled with a potting material. The above-described connection device has a disadvantage in that a main body in the form of a printed circuit board is needed, on which the respective diodes are positioned with bent diode leads. In this way, a current-carrying arrangement is obtained in the housing which is comparatively inflexible to handle and which it is difficult or impossible to adapt to different requirements, such as for example to a different number of solar module solar cells to be connected.

EP 0 999 601 A1 describes a another known and comparable connection device, in which, however, a plurality of bypass diodes are connected in the upper housing to corresponding terminals, before the housing is fitted with its bottom opening over a lower connection arrangement on the solar panel, at which the individual conductors of the solar module lead out and are connected to corresponding terminals. On application of the upper housing, the terminals thereof are connected to respective terminals of the lower connection arrangement. In the event of a defect in one of the bypass diodes, the connection device is repaired by replacing the entire upper housing.

SUMMARY

It is an object of the present invention to provide a connecting device of the above-mentioned type which is comparatively simple and inexpensive to produce using the simplest possible components.

The connecting device connects to at least one external electrical conductor of a photovoltaic solar module. The connecting device includes a plurality of busbars, a support element, a housing, a diode and a contact. The plurality of busbars are arranged next to one another and include a first busbar and a second busbar. The support element is attached to the plurality of busbars and includes a bottom face to be positioned on the solar module. The housing is positioned over the support element and the plurality of busbars and includes an edge surrounding the support element and the busbars when the overhousing is positioned on the solar module. The diode is fitted onto the plurality of busbars and includes diode leads that fit onto one of the plurality of busbars, such that the first and second busbars are connected together via the diode. The contact is positioned with the first busbar for connection with a first contact zone of the first busbar and for connection with the external electrical conductor.

BRIEF DESCRIPTION OF THE DRAWINGS

The invention is explained in more detail below with reference to the Figures shown in the drawings, which illustrate exemplary embodiments of the present invention.

DETAILED DESCRIPTION OF THE EMBODIMENT(S)

Figure 1:
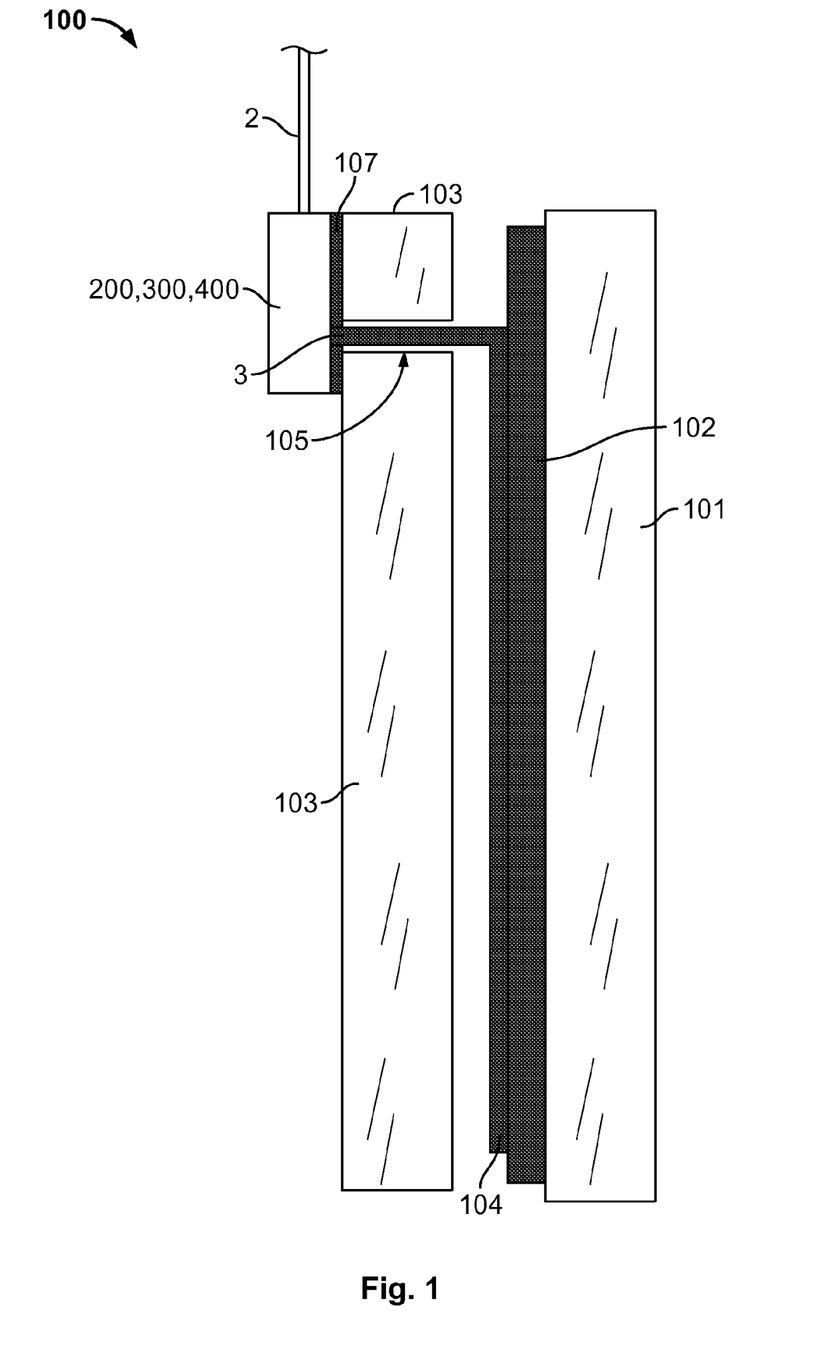
FIG. 1 is a cross-sectional view of a photovoltaic solar module connected to a connecting device according to the invention.

With respect to FIG. 1, a photovoltaic solar module is shown provided with a connecting device in the form of a junction box or connecting box. The solar module 100 includes a multilayer arrangement with a flat first layer 101 on the light-exposed side, which may take the form of a glass sheet or a film-type layer. Furthermore, the solar module 100 includes a flat second layer 103 remote from the light-exposed side, which may likewise take the form of a glass sheet or a film-type layer. In the embodiment shown, layers 101 and 103 take the form of respective glass sheets. Between the two layers 101 and 103 there is located at least one solar cell 102 or an arrangement of a plurality of solar cells 102, which supply electricity by means of a photovoltaic effect when exposed to light. The solar cell(s) 102 is/are connected to an electrical connection system 104. The latter is indicated purely schematically in FIG. 1 and serves in particular to interconnect the solar cell(s) electrically and to connect them to the outside world. The electrical connection system 104 includes for example a copper foil, which is on the one hand electrically contacted with the back of the solar cell(s) 102 and on the other hand develops into one or more electrical conductors 3 of the solar module or is connected to at least one electrical conductor 3 of the solar module, which takes the form for example of a connecting foil or of a connecting tape. By means of such a foil conductor 3, the electrical connection system 104 of the solar module 100 may be connected to an external connecting lead 2, for example in the form of a solar connecting cable.

As is also illustrated in FIG. 1, a connecting device 200, 300 or 400, as explained below in more detail, is attached to the back of the layer 103, which forms an outer surface of the solar module, for example by adhesive bonding of a housing edge 15 or 65 (cf. FIGS. 2 to 19) by means of adhesive 107. Furthermore, the layer 103 includes a lead-through opening 105, through which the electrical conductor 3, for instance in the form of a foil conductor may be passed to the connecting device.

Figure 2:
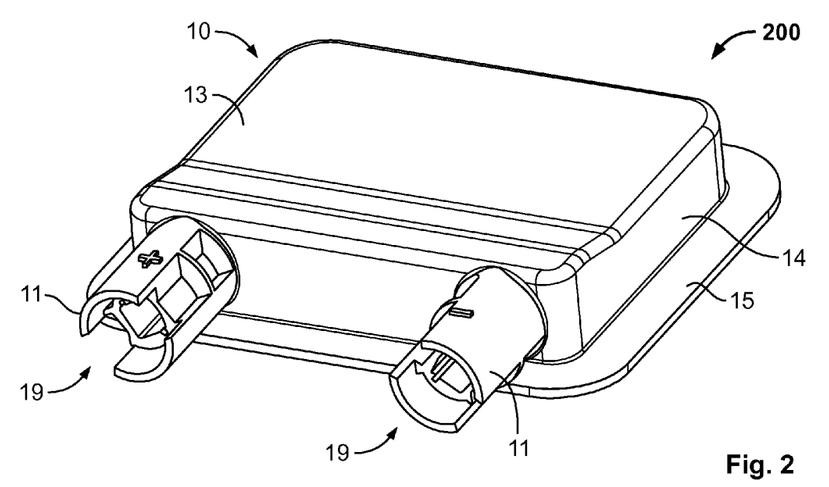
FIG. 2 is a perspective view of a connecting device according to the invention.
Figure 3:
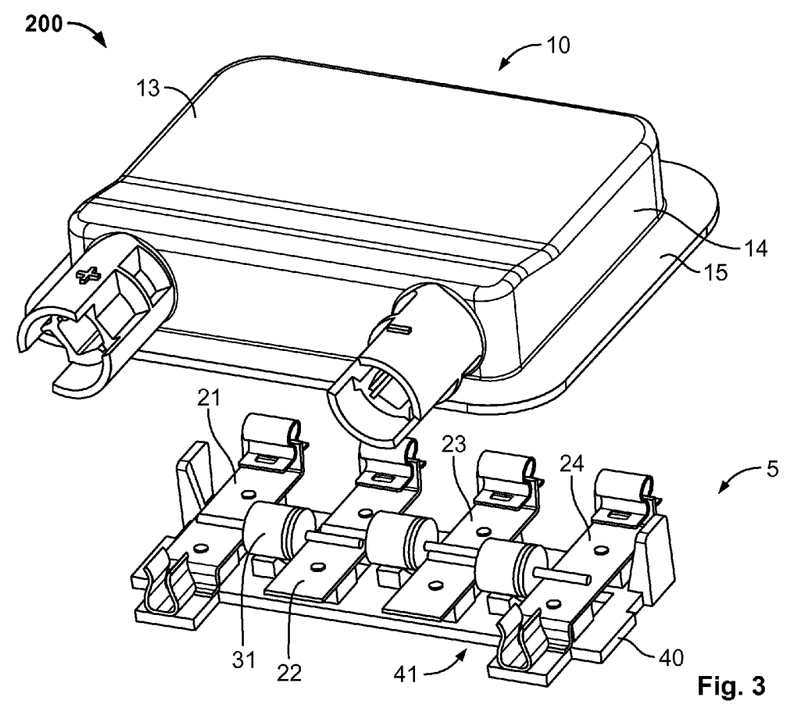
FIG. 3 is an exploded view of the connecting device in FIG. 2.

With respect to FIG. 2, a connecting device 200 according to the invention is shown, having two main components, namely by a functional unit 5 and a housing 10, which is fitted over the functional unit 5. To this end, the housing 10 includes an edge 15 around it, which may be arranged on the solar module 100 by being placed thereon and may be sealingly connected to the solar module. For this purpose, the lower bearing surface of the edge 15 of the housing 10 has a substantially flat surface, which is suitable for placing on the likewise flat solar module 100 and may accordingly be secured. The surrounding edge 15 is connected by way of a vertical housing wall 14, which forms the four side walls of the housing 10, to a plate-shaped horizontal housing wall 13, which is arranged substantially parallel to the solar module when the housing 10 is fitted to the solar module. In one of the side walls of the vertical housing wall 14, in FIGS. 2 and 3, two connection bushings 11 are positioned in the side wall pointing to the front, which are provided with respective plug-and-socket connecting devices 19 for connecting the connecting cable 2 (not shown in FIGS. 2 and 3) to electrically conductive parts within the housing 10.

The functional unit 5 arranged in the housing 10 here includes four busbars 21 to 24, as will be explained in greater detail below. The arrangement of the busbars 21 to 24 is to be regarded as an example and may also vary as required. In particular, the number of busbars used may vary as required. In the embodiment shown, the outer two busbars 21 and 24 include a respective contact zone, which may be connected to an external conductor. The outer two busbars 21 and 24 may be connected to respective connecting cables 2 by way of the connection bushings 11 arranged on the housing 10. The two busbars 22 and 23 located in the middle are connected in their end regions merely with a corresponding foil conductor of the solar module connection system. In this context, it is possible for the busbars 21 and 24 and the connection bushings 11 to be arranged in the middle of the housing 10, while the busbars 22 and 23 may be arranged in the right and left-hand peripheral areas of the housing 10. In other embodiments, it is possible, if needed and as required, for just two of the busbars 21 to 24 to be provided in the housing 10, to form a functional unit 5. The busbars 21 to 24 are held on a support element 40, which includes a bottom face 41, by way of which the support element may be arranged on the solar module 100 by being placed thereon.

Production of a connecting device 200 according to the invention, as shown in FIG. 2, will be explained in greater detail below with reference to FIGS. 4 to 7.

Figure 4:
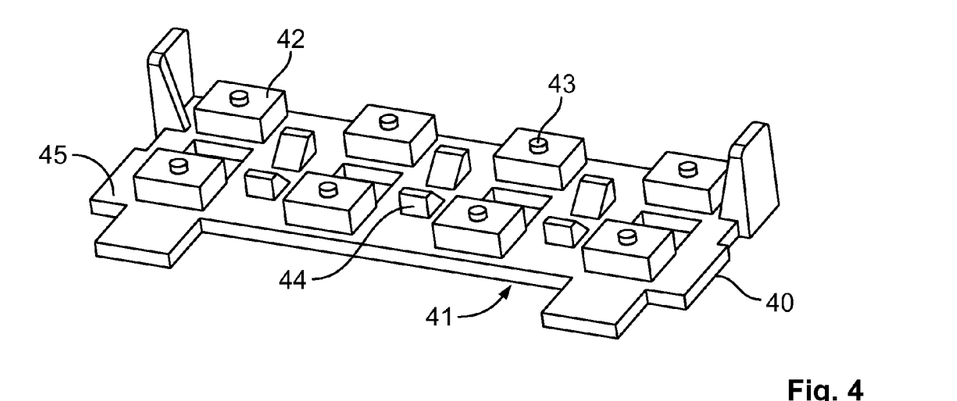
FIG. 4 is a perspective view of a preliminary manufacturing step of the connecting device according to the invention, showing a support element of the connecting device.

As is clear in greater detail from FIG. 4, firstly a support element 40 is provided, which comprises a substantially flat bottom face 41, such that the support element 40 may be placed by way of the bottom face 41 on the solar module 100, which is likewise of substantially flat construction. On the support element 40 there are provided supports 42 for the busbars 21 to 24, and supports 44 for the diodes 31 to 33, which are connected to the busbars 21 to 24. The support element 40 is thus constructed in such a way that the individual busbars 21 to 24 may be placed in an individually assembleable manner on the support element. The busbars 21 to 24 are placed onto the respective supports 42 and may be fixed to the support element 40 by a respective locking element 43. One or more locking elements 43 per busbar may be provided for this purpose. The bottom face 41 is positioned on the underside of a base plate 45, on which the supports 43 and 44 are arranged.

Figure 5:
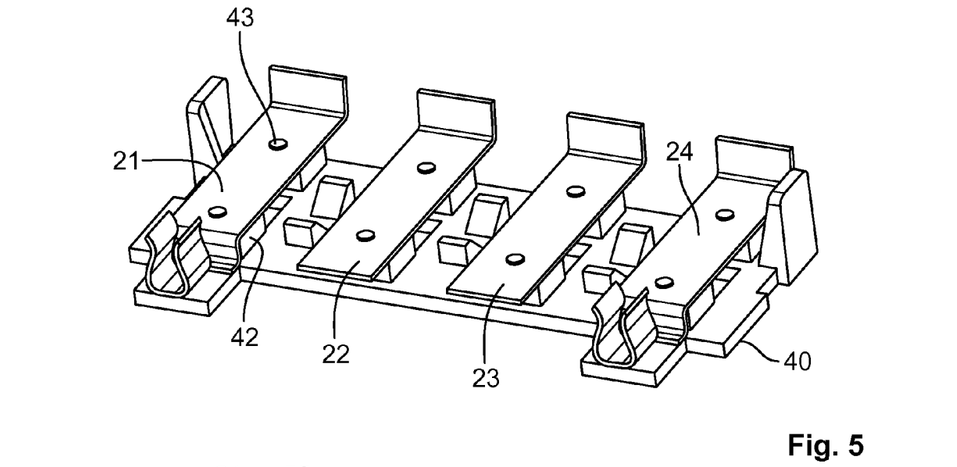
FIG. 5 is a perspective view of a subsequent manufacturing step of the connecting device according to the invention, showing busbars in the connecting device.

As is further described with reference to FIG. 5, the current-carrying parts take the form of substantially identically and/or simply configured busbars 21 to 24, which have been shaped and optionally bent, for example, from a metal strip. These busbars 21 to 24 are assembled individually on the support element 40. To this end, explained for example with reference to the busbar 21, the latter is placed onto the corresponding supports 42 and locked by means of the locking element 43 in the front and rear areas of the busbar 21. The locking element 43 may take the form for example of a plastics lug or the like, which is softened by thermal contact with a heating element and deformed into a mushroom shape, for example (so-called "hot staking"). Alternatively, it is also possible for the busbars to be snap-fitted to the respective locking element 43 or fastened in some other way.

Figure 6:
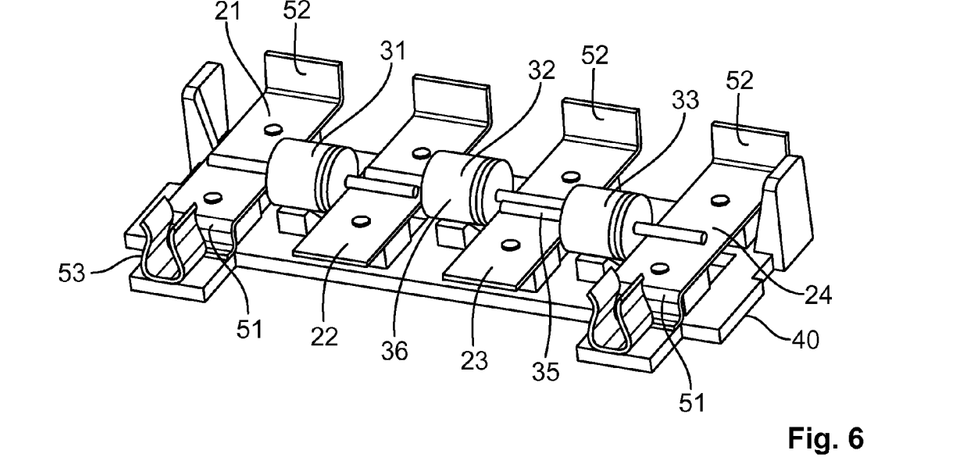
FIG. 6 is a perspective view of another subsequent manufacturing step of the connecting device according to the invention, showing diodes in the connecting device.

As is further illustrated in FIG. 6, the first busbar 21 includes a first contact zone 51 for connection with an external electrical conductor, for example of a connecting cable 2, as explained above, and a second contact zone 52, which is provided for connection with the electrical connection system of the solar module or with the foil conductor 3 thereof. In the embodiment shown, the busbar 21 is bent upwards in the second contact zone 52, such that a foil conductor of the electrical connection system of the solar module, which leads out of the multilayer arrangement of the solar module, may be applied to the upwardly bent portion within the contact zone 52. As described with reference to FIG. 7, a foil conductor or the like is applied to the upwardly bent portion within the contact zone 52 and secured to a spring element 56, which here takes the form of an Ω spring. The foil conductor of the connection system is not shown in FIGS. 6 and 7.

In addition, in the embodiment shown, the busbar 21 is extended and modified on one side in the contact zone 51 in such a way that contacting (plugging in and disconnection) is possible with a cable-side contact element. In the present embodiment the contact zone 51 of the busbar 21 comprises a mating contact 53, which may be connected to a contact element on the housing 10 or on a cable 2, as explained in greater detail below. The mating contact 53 takes the form in the present embodiment of a U-shaped contact, into which a corresponding pin contact may be introduced in the horizontal or vertical direction. The above explanations regarding the busbar 21 also apply in similar manner to the busbar 24, which is connected to an electrical conductor of a second connecting cable 2.

In addition to the busbar 21, a second busbar 22 is arranged substantially parallel to the first busbar 21, the busbar includes a contact zone 52 for connection with a foil conductor 3 of the electrical connection system of the solar module. A diode 31 includes diode leads 35, which are fitted in each case to one of the busbars 21, 22 and are electrically connected to the respective busbar. In particular, one of the diode leads 35 is applied to the busbar 21 and connected electrically thereto, while the other opposing diode lead 35 of the diode 31 is applied to the second busbar 22 and electrically connected thereto. Thus, the first and second busbars 21, 22 are electrically connected together by way of the diode 31. In addition to the busbar 22, a third busbar 23 and a fourth busbar 24 are each arranged substantially parallel to the busbars 21 and 22. Further diodes 32 and 33 are provided in a similar manner to the diode 31, which further diodes 32 and 33 are fitted with their respective diode leads 35 in each case to one of the busbars 22 to 24 and are electrically connected to the respective busbar. For instance, the diode 32 connects the busbars 22 and 23 together, while the diode 33 connects the busbars 23 and 24 together. In the embodiment shown, the diodes 31 to 33 take the form of round diodes, the respective diode body 36 being arranged between the busbars in each case connected together and extending in a space-saving manner in each case below and above the busbars. With the design described, a space-saving arrangement of the busbars and diodes may be achieved.

The diodes 31 to 33 and the busbars 21 to 24 are arranged in such a way that the respective diode leads 35 lead substantially straight out of the respective diode 31 to 33 and are also connected in this straight led-out manner to the respective busbar. The respective diode leads are inserted for example into correspondingly provided contact portions, for example in the form of grooves, and connected by welding or crimping to the respective busbar. According to the embodiment shown, it is not necessary to bend the diode leads for contacting with the respective busbars, for example in order to be inserted vertically into a respective busbar. Instead, the respective diodes may be simply inserted as delivered into a respective contact portion with straight diode leads and connected to the corresponding busbar. Through this arrangement and through the arrangement of the diode bodies 36 between the respective busbars 21 to 24, these current-carrying parts are arranged in an overall space-saving manner, such that the space taken up by the current-carrying parts may be reduced in the connector housing of the connecting device. In the embodiment according to FIGS. 6 and 7, the diodes 31 to 33 are extend lengthwise across the busbars 21 to 24, the respective diode body 36 being arranged between the corresponding busbars.

Figure 7:
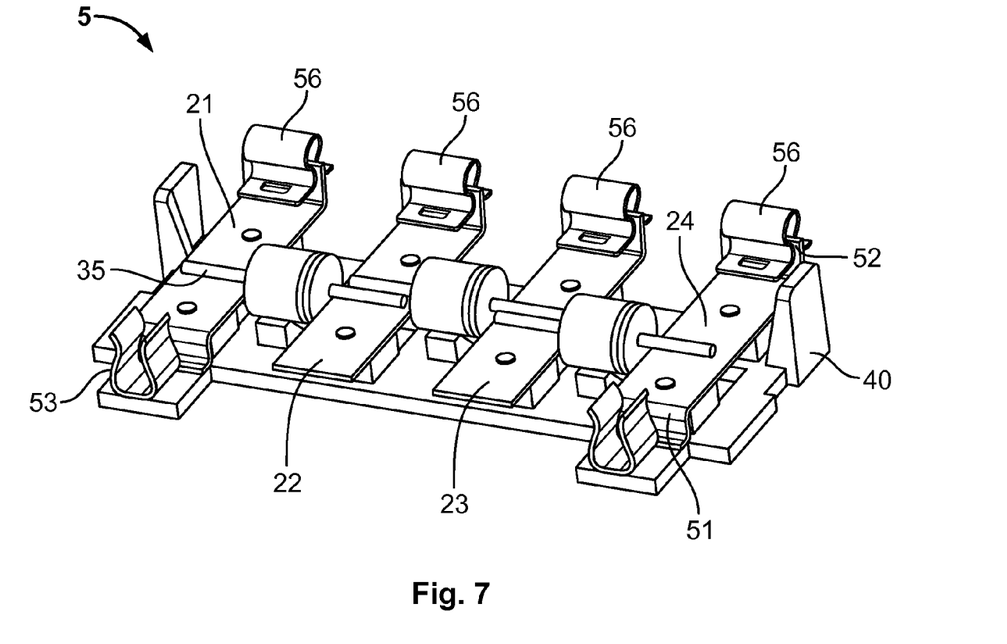
FIG. 7 is a perspective view of another subsequent manufacturing step of the connecting device according to the invention, showing spring elements in the connecting device.

The functional unit 5 shown in FIG. 7, which is delivered as is for example by a manufacturer of the connecting device (with or without an Ω spring 56), may be positioned with the support element 40 on a solar module. For positioning of the housing 10 over the functional unit 5, additional guide elements or centring elements may be provided, which are not shown in any greater detail in FIG. 7. Alternatively, it is also possible for the diodes firstly to be welded to the busbars and for the resultant, preassembled unit then to be positioned on the support element 40, for example clipped therein or attached thereto by heat-shaping. To attach the support element 40 to the solar module, according an embodiment of the invention, an adhesive component may be provided, for fixing the support element 40 to a certain degree to the solar module. For example, a double-sided adhesive tape may be used as the adhesive component.

Figure 8:
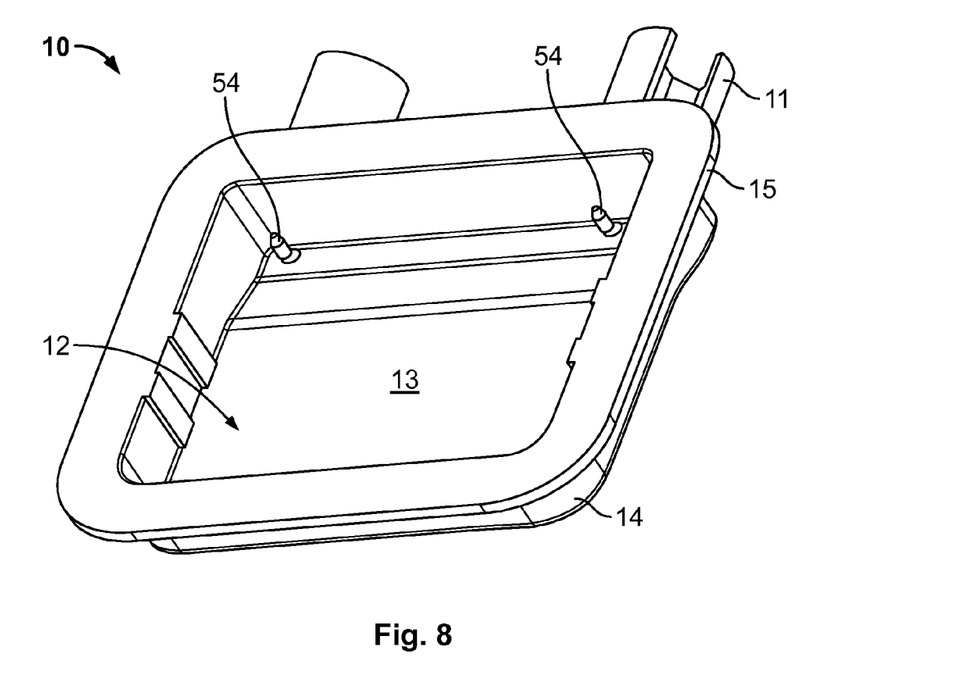
FIG. 8 is a perspective view of an underside of a housing of the connecting device in FIG. 2.

As is additionally shown in FIG. 8, contacts 54 are held in the housing 10 on a fastening element. In the embodiment shown, the fastening element takes the form of the horizontal housing wall 13 of the housing 10 or a corresponding other shaped portion on the housing 10. The contacts 54, shown here, are bent, in order to be contacted with the mating contact 53 on the functional unit 5. In another embodiment, it may be preferred, however, for the contacts 54 to take the form of straight pin contacts, which are pressed from above into the respective U-shaped mating contact 53 when the housing 10 is placed onto the solar module, such that they extend horizontally away from the busbars 21 and 24 in the direction of the respective connecting cable. When the housing 10 is placed onto the solar module, the functional unit 5 together with the support element 40 and busbars 21 to 24 are positioned in the opening 12 of the housing 10, such that in this position the edge 15 surrounds the support element 40 and the busbars 21 to 24. As described, in this production step the contacts 54 integrated in the housing 10, which may be straight or bent, are electrically connected to the respective busbar 21 or 24. The other ends of these contacts 54 project into the external plug-in connection of the plug-and-socket connecting device 19 (as illustrated schematically in FIG. 2), which for example accommodates, locks in place and contacts a corresponding cable plug on the connecting cable 2.

Prior to positioning of the housing 10 onto the solar module, the edge 15 thereof is provided, on its underside and optionally on further relevant surfaces of the housing coming into contact with the solar module, with a suitable adhesive component or sealing component (cf. adhesive 107 according to FIG. 1), in particular a silicone-based sealing glue. After curing of the adhesive on the underside of the edge 15 after positioning of the housing 10 on the solar module, the electrically conductive parts inside the housing 10 are largely hermetically shielded against environmental influences and secured against being touched. Due to pre-fixing of the support element 40 on the solar module, for example by way of double-sided adhesive tape, the solar module with fitted connecting device 200 may in principle be stored and transported immediately even in a vertical position, since in this case the support element 40 assumes the pre-fixing function until the sealing glue applied to the edge 15 is appropriately cured. The adhesive component positioned on the support element 40 should here exhibit such an adhesive force that at least the intrinsic weight of the connecting device 200 may be supported. As soon as curing has taken place, the housing 10 may fully assume its protective function and also absorb mechanical forces, which may possibly act on the connecting device 200 as a result of pulling on the connecting cable 2.

Figure 9:
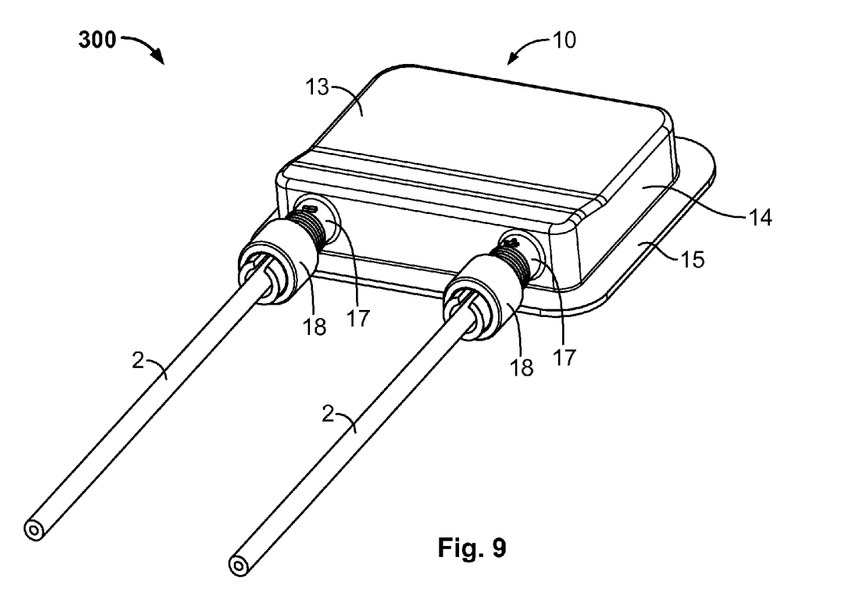
FIG. 9 is a perspective view of another connecting device according to the invention.

With respect to FIG. 9, another connecting device 300 according to the invention is shown, which largely corresponds to the structure of the connecting device 200, as explained above with reference to FIGS. 2 to 8. In particular, the functional unit 5, which is arranged in the interior of the housing 10, corresponds to the functional unit 5 of the connecting device 200 according to FIGS. 2 to 8. Unlike the connecting device 200, the connecting device 300 comprises connection bushings 17 for the connecting cable 2 which differ from the connection bushings 11 as explained with reference to FIGS. 2 and 3. The connection bushings 17 are here configured in such a way that the connecting cable 2 may be attached to the housing 10 by means of a cable gland or another type of cable fastening. In the embodiment shown, the connection bushings 17 include a corresponding external thread, to which a respective cable gland 18 may be fitted, in order to connect a respective connecting cable 2 to the housing 10.

Figure 10:
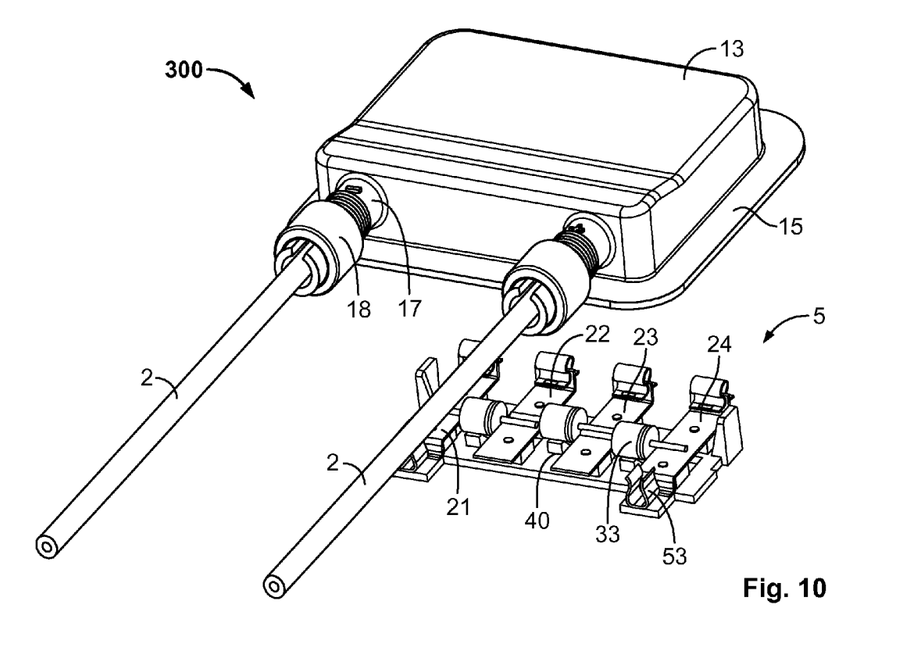
FIG. 10 is an exploded perspective view of the connecting device in FIG. 9.
Figure 11:
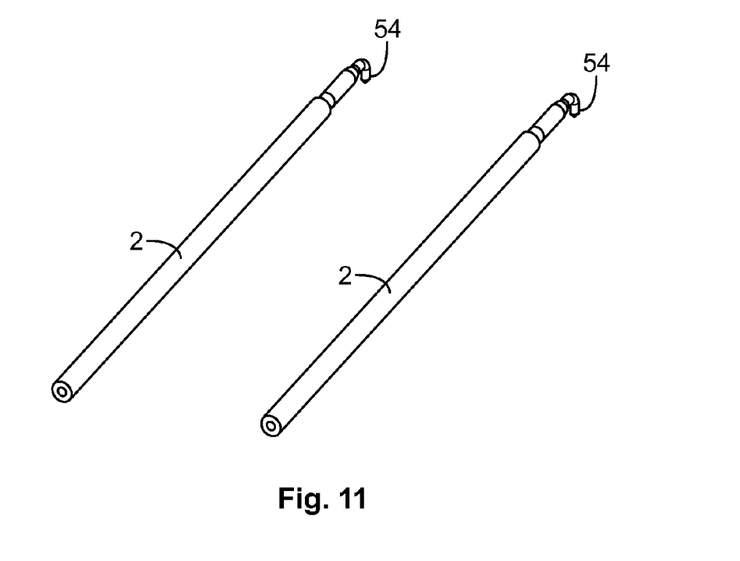
FIG. 11 is a perspective view of a connecting cable that is connected to the connecting device according to FIG. 9.

As is also shown in FIG. 10, the connecting cable 2 is fitted to the housing 10 before the housing 10 is positioned over the support element 40 and placed onto the solar module. In the embodiment shown, a contact 54 is arranged on an electrical conductor of the respective connecting cable 2, as shown in greater detail with reference to FIG. 11. When the housing 10 is placed onto the solar module, the respective contact 54, which may be bent or straight, is positioned from above into the corresponding mating contact 53 on the functional unit 5. This is performed in a similar manner to the connecting device 200 according to FIGS. 2 to 8.

Figure 12:
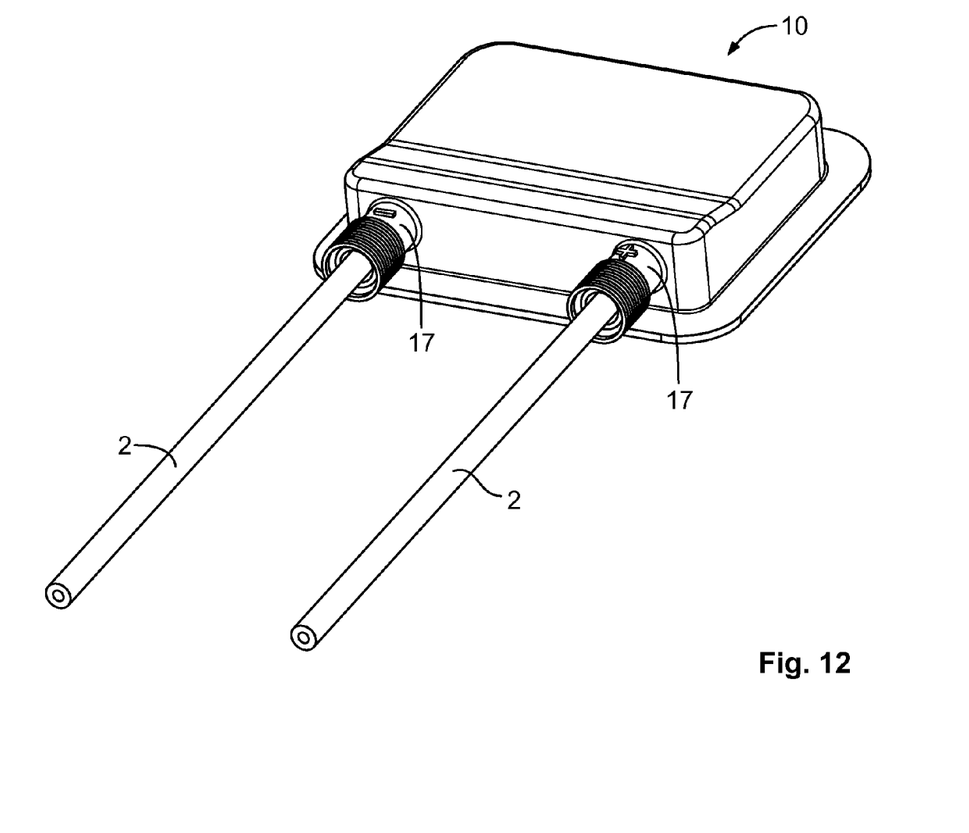
FIG. 12 is a perspective view of the connecting cable connected to the connecting device according to FIG. 9.

FIG. 12 shows another embodiment, according to which the cable 2 together with the fitted contacts 54 is subsequently introduced through the connection bushings 17 into the housing 10, in order to be connected to the corresponding mating contact 53 of the functional unit 5. The contacts 54 in each case take the form of straight pin contacts, which are introduced horizontally into the respective mating contact 53. The variants of the contacts 53 and 54 as U-shaped contacts or pin contacts should be regarded merely as examples, which may be possible to provide any other type of plug-and-socket connection in this location. This also applies in a similar manner to the other embodiments of the connecting devices 200, 300 or 400. After introduction of the connecting cable 2 into the respective connection bushing 17, the connecting cables 2 are fixed on the housing 10 using corresponding cable glands, wherein the cable glands 18 according to FIGS. 9 and 10 may be used as cable glands.

Figure 13:
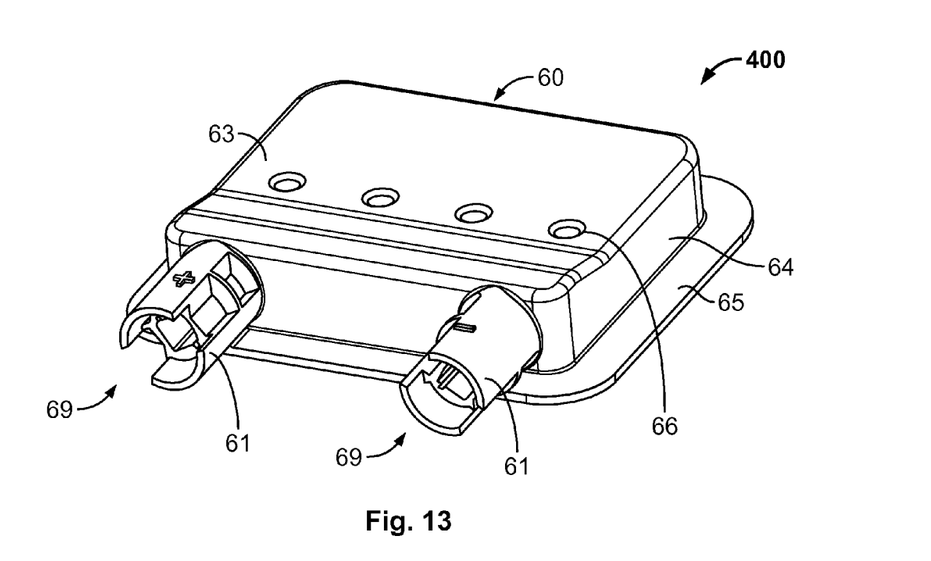
FIG. 13 is a perspective view of another connecting device according to the invention.
Figure 14:
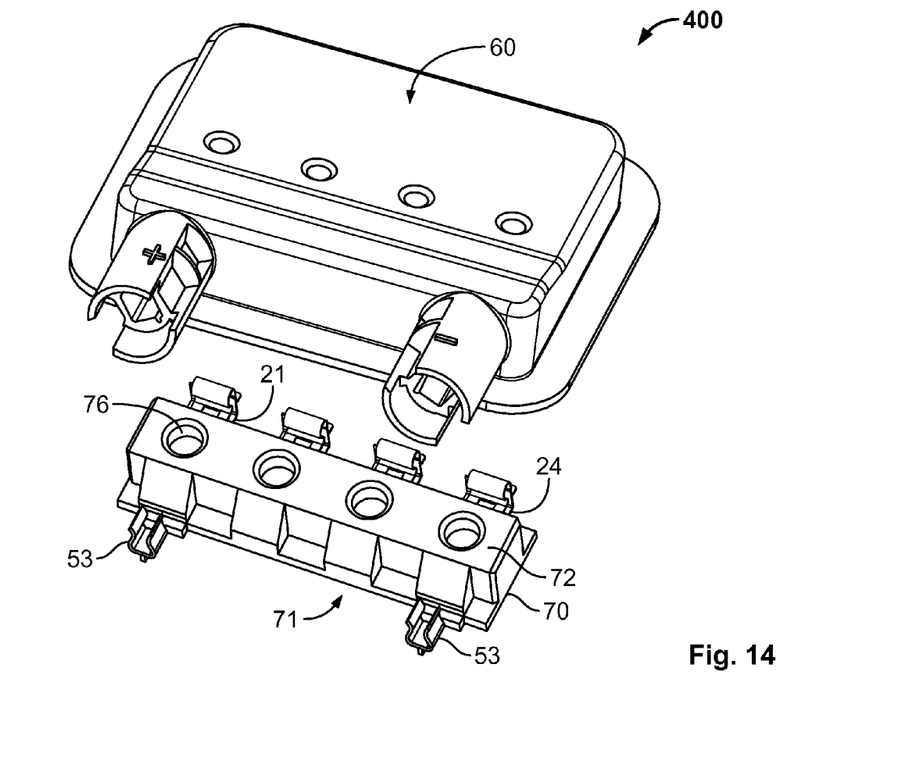
FIG. 14 is an exploded perspective view the connecting device according to FIG. 13.
Figure 15:
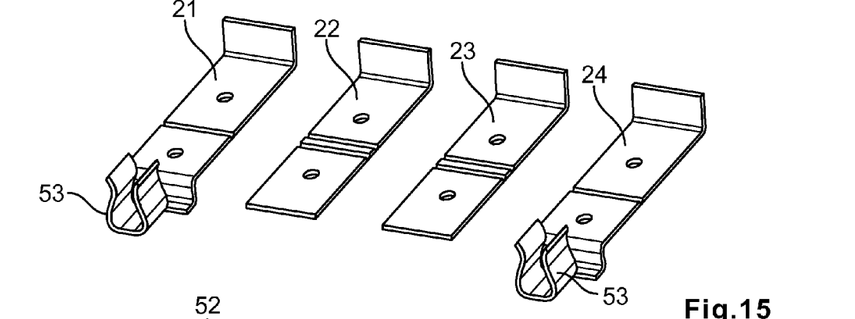
FIG. 15 is a perspective view of a preliminary manufacturing step of the connecting device according to FIG. 13, showing busbars and mating contacts of the connecting device.

With respect to FIG. 13, another connecting device 400 according to the invention is shown, where in a similar manner to the embodiments of connecting devices 200 and 300, as described above, two individually assembled busbars 21 to 24 are used, which are of identical or in principle similar construction to the busbars 21 to 24 of the connecting devices 200 and 300. In contrast, the support element 70 of the connecting device 400 is of different construction. In the embodiment shown, the support element 70 is formed of a plastics housing 72, which encloses at least part of the busbars 21 to 24 and at least one diode, which connects two busbars together electrically, so forming a functional unit 5. If a plurality of busbars and a plurality of diodes are provided, the plastics housing accordingly encloses part of these busbars and the entirety of the diodes. With regard to the construction of the individual busbars 21 to 24 and the diodes 31 to 33, reference is made to the explanations provided in relation to FIGS. 2 to 8.

With reference to FIGS. 15 to 18, manufacturing of a connecting device 400, according to the invention is explained in greater detail.

Figure 16:
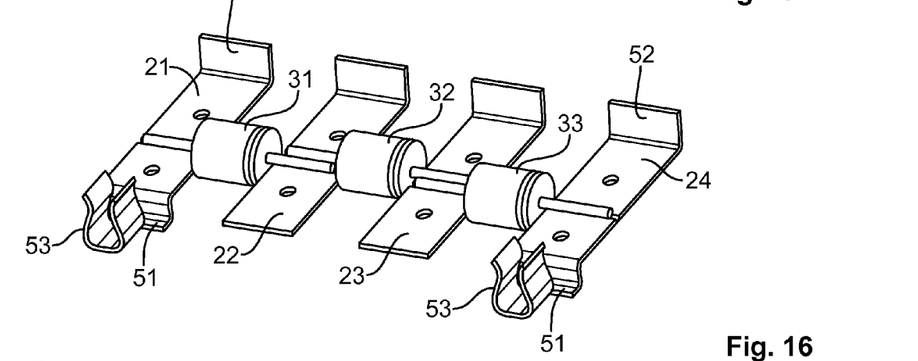
FIG. 16 is a perspective view of a subsequent manufacturing step of the connecting device according to FIG. 13, showing diodes of the connecting device.
Figure 17:
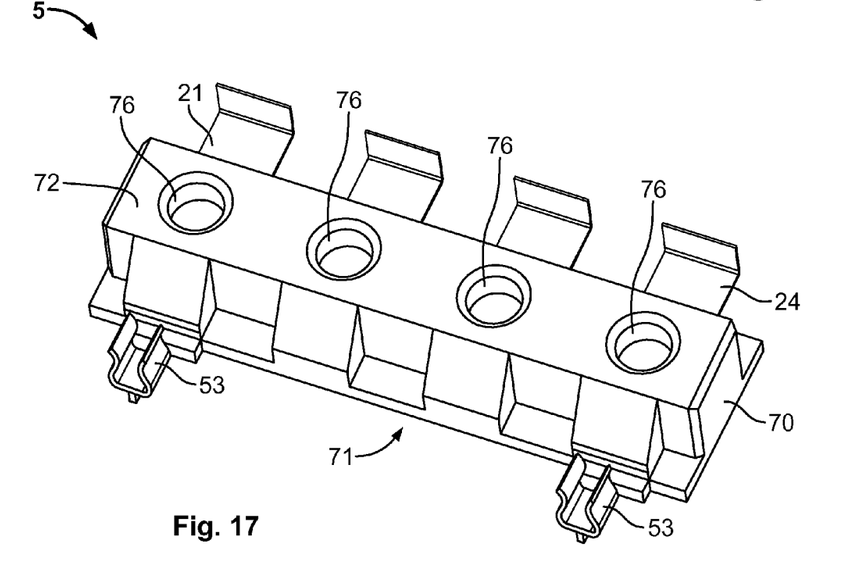
FIG. 17 is a perspective view of another subsequent manufacturing step of the connecting device according to FIG. 13, showing a plastic housing of the connecting device.

The individual busbars 21 and 24 are positioned substantially parallel to one another in a suitable tool and connected to the diodes 31 to 33, as shown in FIG. 16. The current-carrying parts arranged in this way are then encapsulated with plastics material by injection moulding or potting, such that at least part of the busbars 21 to 24 and the diodes 31 to 33 are surrounded by a housing 72 formed of the plastics material, so forming a functional unit 5. In this way, a support element 70 is formed which includes on its underside a bottom face 71, which serves as a bearing surface by way of which the support element 70 is placed onto the solar module. The diodes 31 to 33 arranged in a row next to one another are surrounded by the plastics housing 72, which lengthwise surrounds the diodes 31 to 33 and which extends lengthwise across the busbars 21 to 24. The plastics housing 72 may in principle adopt any suitable shape, for example it may also extend upwards between the busbars 21 to 24, such that the insulation distances between the busbars may be further reduced. Encapsulation by injection moulding or potting of the pre-assembled, current-carrying arrangement illustrated in FIG. 16, results in a compact functional unit 5, as shown in FIG. 17, which is comparatively simple to handle and displays a degree of mechanical stability. In this way, the functional unit 5 may be positioned in the housing 60 without risk of damage. The unit formed by the plastics housing 72 may in principle be replaced as a whole when servicing is required, i.e. in the event of failure of one or more of the diodes 31 to 33. This simplifies handling from the user's standpoint, in that only simply configured components have to be replaced.

In the case of partial shading of a solar installation, the bypass diodes 31 to 33 are activated, which may under certain circumstances become very hot. Encapsulation of the current-carrying components by injection moulding or potting to form a housing block, so forming the functional unit 5, results in improved heat dissipation, which has an overall positive effect on the performance of the connecting device. It is additionally possible to achieve the maximum possible degree of automation of parts manufacture, assembly and handling on the part of the user whilst maintaining the existing standard.

Figure 18:
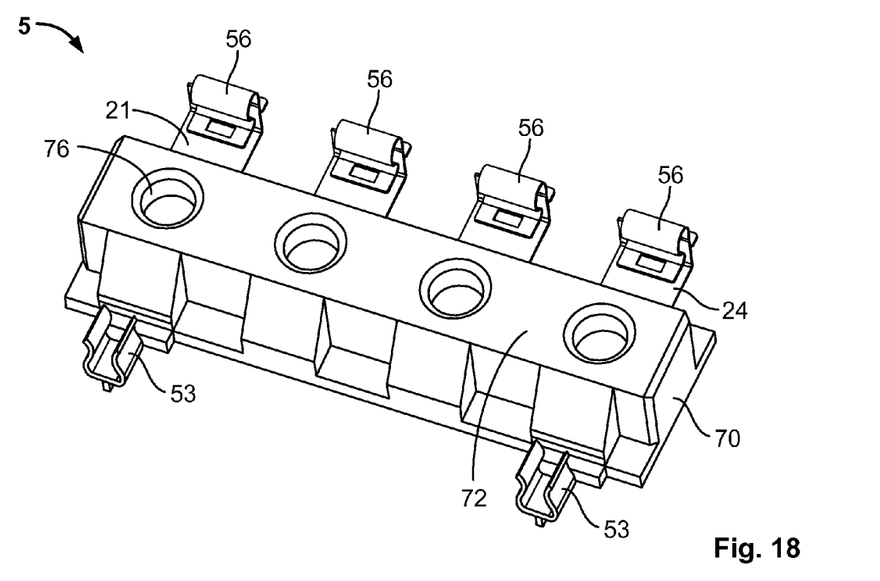
FIG. 18 is a perspective view of another subsequent manufacturing step of the connecting device according to FIG. 13, showing spring elements in the connecting device.
Figure 19:
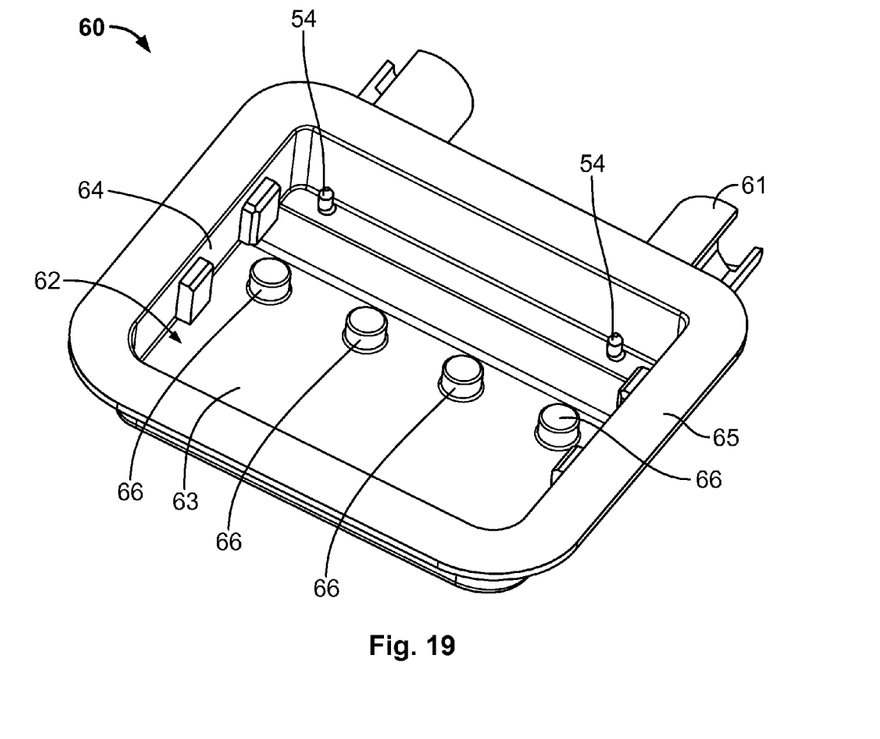
FIG. 19 is a perspective view of an underside of a housing of the connecting device according to FIG. 13.

FIG. 19 shows the underside of a housing 60, in the opening 62 of which the functional unit 5 according to FIG. 18 is arranged. In a similar manner to the housing 10 of the connecting device 200, the housing 60 comprises a horizontal housing wall 63 and a vertical housing wall 64, which in the form of side walls joins the edge 65 surrounding the housing 60 to the horizontal housing wall 63. In addition, connection bushings 61 are provided on the housing 60, which are identical in construction to the connection bushings 11 of the connecting device 200. Contacts 54 are accordingly arranged in the housing 60, which contacts 54 make contact with a respective mating contact 53 on the functional unit 5 when the housing 60 is positioned over the functional unit 5 onto the solar module. In this context, reference is made to the explanations made above in relation to the connecting devices 200 and 300.

In relation to the heat to be dissipated from the diodes, in the embodiment shown, the plastics housing 72 of the functional unit 5 includes at least one well 76, which comes into contact with a corresponding raised portion 66 on the inside of the housing 60, more precisely on the inside of the horizontal housing wall 63 of the housing 60, as is clear from viewing FIGS. 17 to 19 together. The wells 76 and raised portions 66 assist in improved heat dissipation to the outside of the connector housing. To achieve improved heat dissipation, the wells 76 in the plastics housing 72 are positioned as close as possible to the heat source. The wells 76 are shown symbolically, in the shown embodiment, by funnels. The housing surface of the plastics housing 72 is also enlarged, such that heat dissipation may be increased by an enlarged transitional surface. The raised portions 66 positioned on the inside of the housing 60 correspond in extent and diameter to the wells 76. It is also possible, instead of the wells 76 to provide corresponding raised portions on the plastics housing 72, which correspond with corresponding wells on the inside of the housing 60.

This improved heat dissipation may be additionally promoted by providing the plastics housing 72 with at least one well or raised portion 76, 66, which comes into contact 54 respectively with a corresponding raised portion or well 66, 76 on the inside of the housing 60. In particular, the well or raised portion 76, 66 is formed on the plastics housing 72 in such a way that heat developed within the plastics housing 72 is at least partly dissipated via the well or raised portion 76, 66 on the plastics housing 72 to the corresponding raised portion or well 66, 76 on the housing 60. The well or raised portion 76, 66 on the plastics housing 72 may as far as possible be provided in the vicinity of the heat source and takes the form, for example, of a funnel or the like. In this way, the housing surface of the plastics housing 72 is also enlarged, whereby the quantity of heat dissipated by the plastics housing 72 may be increased. The wells 76, for example in the form of funnels, in the plastics housing 72 or the corresponding raised portions 66 may also assume a guiding and centring function upon final assembly of the connecting device, to the effect that they allow perfectly fitting serving up and fastening of the housing 60 relative to the support element, such that functional unit 5 and housing 60 are correctly oriented one relative to the other.

The wells 76 may, together with the raised portions 66 on the housing 60, also assume a guiding and centring function upon final assembly of the connecting device 400, wherein they allow perfectly fitting serving up and fastening of the housing 60. In this production process, the integral contacts 54 are also electrically connected to the corresponding mating contacts on the busbars 21 and 24 of the functional unit 5. The other ends of these contacts project in turn into an external plug-in connection, by means of which a corresponding connecting cable plug may be contacted, received, and locked in place. The housing 60 is fastened to a solar module in the same way as already explained above with reference to the housing 10 of the connecting devices 200 and 300. With regard to different cable connection variants, all embodiments which have already been described in relation to the embodiments of FIGS. 2 to 12 are here also conceivable.

Prior to positioning of the housing 60, the foil conductors of the connection system of the solar module are attached to the respective busbars 21 to 24. To this end, $\Omega$ springs 56 are for example used, as shown in FIG. 17, which are fitted onto the respective busbars 21 to 24. The foil conductors are connected detachably to the busbars. Detachable connection of the foil conductors may be effected by the user, for example in an automatable step by means of the $\Omega$ springs 56. The foil conductors may however also be fixedly contacted with the respective busbars 21 to 24 by soldering or welding. In this context, the invention offers the advantage that the foil conductors may be connected to the functional unit 5 or the busbars 21 to 24 in a situation in which the functional unit 5 is very readily accessible. This is a consequence of the fact that the functional unit 5 has not yet been arranged in a surrounding connector housing, but rather has merely been pre-fixed on the solar module by way of the underside of the support element 40 or 70. In this situation, the functional unit 5 is very readily accessible from all sides, such that the current-carrying parts may be contacted appropriately rapidly and easily. Upon fitting of the housing 10 or 60, rapid and reliable contact is again brought about on the cable connection side and in the same step a hermetic seal is achieved between the current-carrying parts and external environmental influences. If the connecting cable has already been fitted on the housing, assembly is concluded at this point. Otherwise, a connecting cable may be fastened to the housing by simple plug-in connection and connected to the current-carrying parts arranged therein.

Advantages of the invention are thus significantly reduced costs for producing a connecting device compared with the connection methods described in the introduction. Moreover, the number of components is reduced and the components are simplified, as are the steps for assembly thereof In addition, the connecting device is structurally simplified, and savings are made in material and assembly costs.

The invention thus offers the advantage that it is possible with such a connecting device to achieve a marked reduction in costs relative to conventional connecting devices. This is achieved in particular in that the connecting device according to the invention results in smaller dimensions and consequent savings in material. In addition, it is possible to use fewer and nevertheless simpler components, resulting, moreover, in the maximum possible level of automation in parts manufacture and assembly. The invention additionally makes it possible for a handling method modified from previously known methods to be performed automatically on the premises of the user of the connecting device.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A connecting device for connecting an external electrical conductor to an electrical connection system of a photovoltaic solar module, comprising:
 a plurality of busbars arranged next to one another and having at least a first busbar with a first contact zone for connection to the electrical conductor and a second contact zone for connection to the electrical connection system of the solar module, and a second busbar with a contact zone for connection to the electrical connection system of the solar module;
 a support element attached to the plurality of busbars and having a bottom face to be positioned on the solar module;
 a housing positioned over the support element and the plurality of busbars and having an edge surrounding the support element and the plurality of busbars when positioned on the solar module;
 a diode fitted onto the plurality of busbars and having diode leads fitted onto one of the plurality of busbars and connected to the respective plurality of busbars such that the first and second busbars are connected together via the diode; and
 a contact positioned in the first contact zone for connection with the first contact zone of the first busbar and for connection with the external electrical conductor.

2. The connecting device according to claim 1, wherein the contact is secured in the housing by a fastening element.

3. The connecting device according to claim 2, wherein the contact is a plug-and-socket connection that is positioned between the first busbar and the external electrical conductor.

4. The connecting device according to claim 3, wherein
 (a) the housing has a connection bushing;
 (b) the external electrical conductor has a plug-and-socket device; and
 (c) the plug-and-socket connection is positioned on the connection bushing to cooperate with the corresponding plug-and-socket device on the external connecting conductor.

5. The connecting device according to claim 1, wherein the first busbar includes a mating contact in the first contact zone which is in operative connection with the contact in order to connect the external electrical conductor to the first busbar.

6. The connecting device according to claim 1, wherein the first busbar is connected to a mating contact which is in operative connection with the contact in order to connect the external electrical conductor to the first busbar.

7. The connecting device according to claim 1, wherein the plurality of busbars rest individually on the support element.

8. The connecting device according to claim 7, wherein a locking element is positioned on the support element to secure one or more of the plurality of busbars to the support element.

9. The connecting device according to claim 1, wherein the support element is prepared from a plastics housing as a functional unit which encloses at least part of the plurality of busbars and the diode.

10. The connecting device according to claim 9, wherein at least part of the plurality of busbars and the diode are encapsulated in the plastics housing by injection moulding.

11. The connecting device according to claim 9, wherein at least part of the plurality of busbars and the diode are encapsulated in the plastics housing by potting.

12. The connecting device according to claim 9, wherein the plastics housing includes a well or raised portion that engages a corresponding raised portion or well on the inside of the housing.

13. The connecting device according to claim 12, wherein the well or raised portion is formed on the plastics housing such that heat developed within the plastics housing is dissipated through the well or raised portion on the plastics housing to the corresponding raised portion or well on the housing.

14. The connecting device according to claim 1, wherein the diode is positioned such that the diode leads lead substantially straight out of the diode and are connected to the respective busbar in accordance with their length.

15. The connecting device according to claim 1, wherein the diode extends lengthwise across the first and second busbars and is positioned between the first and second busbar.

16. The connecting device according to claim 1, wherein a plurality of diodes are provided, the plurality of diodes are positioned in a row next to one another and the support element is formed of a plastics housing, which lengthwise surrounds the plurality of diodes and which extends lengthwise across the plurality of busbars.

17. The connecting device according to claim 16, wherein the support element is joined by way of its bottom face facing the solar module to an adhesive component.

18. The connecting device according to claim 17, wherein the adhesive component is a double-sided adhesive tape designed to secure the support element to the solar module.

19. A method for producing a connecting device for connecting at least one external electrical conductor to an electrical connection system of a photovoltaic solar module, comprising the steps of:
 providing a first busbar with a first contact zone for connection to the electrical conductor and a second contact zone for connection to the electrical connection system of the solar module, and a second busbar with a contact zone for connection to the electrical connection system of the solar module;
 providing a support element and fitting the plurality of busbars to the support element;
 fitting the support element to the solar module, by placing a bottom face of the support element onto the solar module;
 fitting a diode lead of a diode onto one of the plurality of busbars and electrically connecting them to the other busbar, such that the first and second busbars are connected to one another through the diode;
 connecting a part of the electrical connection system of the solar module to one of the plurality of busbars;
 fitting a housing over the support element and the plurality of busbars, one edge of the housing being placed on the solar module in order to surround the support element and the plurality of busbars, the housing sealingly connected with the solar module, and at least one contact positioned in the housing being designed for connection to the external electrical conductor and connected to the first contact zone of the first busbar.

20. A method for producing a connecting device for connecting at least one external electrical conductor to an electrical connection system of a photovoltaic solar module, having the following steps:
 providing a first busbar with a first contact zone for connection to the electrical conductor and a second contact zone for connection to the electrical connection system of the solar module, and a second busbar with a contact zone for connection to the electrical connection system of the solar module;

providing a diode such that it connects the first and second busbars together electrically;

forming a support element from a plastics housing, at least part of the first and second busbars and the diode being enclosed in the plastics housing;

fitting the support element to the solar module by placing a bottom face of the support element onto the solar module;

connecting at least part of the electrical connection system of the solar module to at least one of the first or second busbars;

fitting a housing over the support element and the plurality of busbars, at least one edge of the housing being placed on the solar module in such a way as to surround the support element and the plurality of busbars and being sealingly connected with the solar module, and a contact being designed for connection to the external electrical conductor and connected to the first contact zone of the first busbar.

21. The method according to claim 20, wherein the support element is prepared by encapsulating at least part of the plurality of busbars and of the diode with plastics material by injection moulding such that at least part of the plurality of busbars and the diode are surrounded by a common housing formed by the plastics material.

22. The method according to claim 20, wherein the support element is prepared by encapsulating at least part of the plurality of busbars and of the diode with plastics material by potting such that at least part of the plurality of busbars and the diode are surrounded by a common housing formed by the plastics material.

23. The method according to claim 20, wherein the contact being connected to a mating contact is positioned on the first busbar.

24. The method according to claim 20, wherein the contact is secured to the housing before the housing is positioned onto the solar module.

25. The method according to claim 20, wherein the external electrical conductor is secured to the housing and connected to the contact before the housing is positioned onto the solar module.

* * * * *